W. G. NOACK.
SELF LAYING ENDLESS TRACK FOR VEHICLES.
APPLICATION FILED AUG. 1, 1910.
1,014,898.
Patented Jan. 16, 1912.
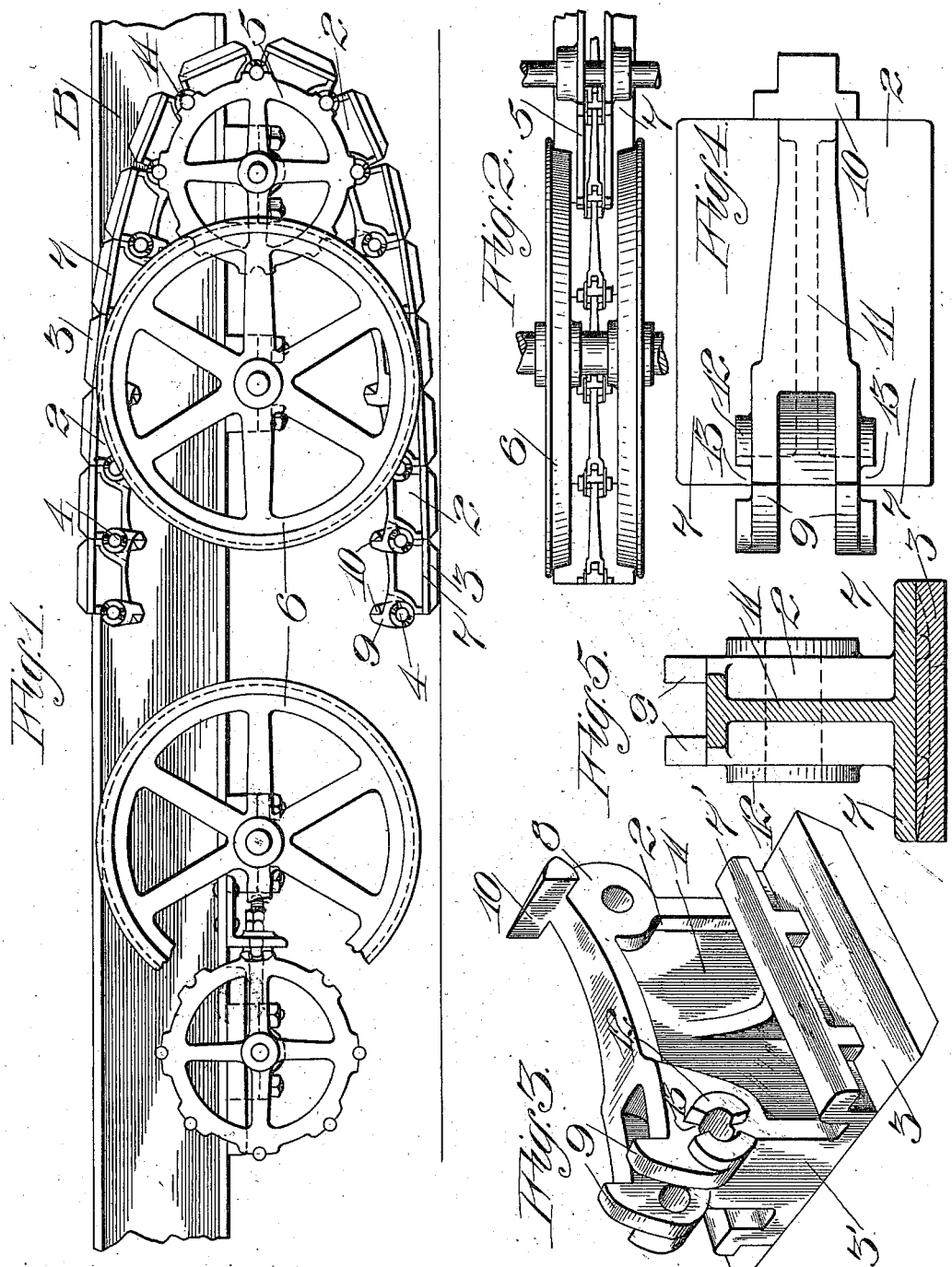
Witnesses
Thos Castberg
R. S. Berry
Inventor
Walter G. Noack
by G. H. Strong
his attorney

UNITED STATES PATENT OFFICE.

WALTER G. NOACK, OF ELMHURST, CALIFORNIA, ASSIGNOR OF ONE-HALF TO WILLIAM A. SAGE, OF HANFORD, CALIFORNIA.

SELF-LAYING ENDLESS TRACK FOR VEHICLES.

1,014,898.  Specification of Letters Patent.  Patented Jan. 16, 1912.

Application filed August 1, 1910. Serial No. 575,044.

*To all whom it may concern:*

Be it known that I, WALTER G. NOACK, citizen of the United States, residing at Elmhurst, in the county of Alameda and State of California, have invented new and useful Improvements in Self-Laying Endless Tracks for Vehicles, of which the following is a specification.

This invention relates to platform wheels of the flexible endless belt type for traction engines and other heavy vehicles.

The object of this invention is to provide a flexible, traveling platform or traction member for heavy vehicles so that they can be operated with success over soft and uneven ground, and over country where there are no roads; and especially to provide an endless, flexible track of peculiar design and construction whereby the several links or sections of the track will present a substantially rigid interlocked body when in a horizontal plane with the links forming a continuous broad bearing surface which will not bend inwardly, but which can readily pivot outward in passing around the end sprockets or pulleys.

The invention consists of the parts and the construction and combination of parts as hereinafter more fully described and claimed, having reference to the accompanying drawings, in which—

Figure 1 is a side elevation of the invention. Fig. 2 is a plan view of a portion of the same. Fig. 3 is an enlarged detail view of a link showing a slight modification. Fig. 4 is a plan view of the same. Fig. 5 is a cross-section of a link.

In the illustrated embodiment of this invention, the platform is made up of a plurality of complementary links 2, having each a substantially flat, transverse, tread portion 3 and squared ends 3', the several links being pivoted together at their ends by a strong bolt or pin 4, the center of which is substantially in the plane of the adjacent end faces of two abutting links. Each link is substantially T-shaped in cross-section, as shown in Fig. 5.

The assembled platform or belt of pivoted links is adapted to travel around suitable, adjustable sprocket wheels 5, appropriately mounted upon the frame B of the vehicle. Between the sprocket wheels 5 are one or more pairs of large guide and supporting wheels 6, journaled also in frame B and supporting the weight on the ground-run of the traction member. These wheels 6 have outside rim flanges which engage the side of a track flange 7 Fig. 5 or 7' Fig. 3 on the back of the several links as the latter pass above and below the wheels 6.

The traveling belt or platform is of such length as to afford the desired horizontal bearing or tread surface between the pairs of large supporting wheels 6; and in order to prevent this horizontal load-bearing or ground-run portion, which is in contact with the ground, from flexing inwardly or caving upwardly, each of the links is formed adjacent to, and on the inner side of, the pivots 4, with overlapping lugs 8 and 9. Each lug 8 has a laterally projecting stop 10 which engages the lug 9 on an adjacent link as soon as the treads 3 of the links 2 assume a horizontal position in the same plane. The lugs 9 and stops 10 are on the opposite side of pivot 4 from the tread surface 3, and the lugs 8—9 cross each other shears-fashion, so that the stops 10 and lugs 9 may supplement the abutment provided by the vertical end walls of the links outside the pivot pins 4 and remove strain from the pivot pins. This is important. Thus, when the flexible platform has passed under the forward guide wheel 6, and rests upon the ground surface, the links 2 are prevented, by the engagement of the lugs 9 and stops 10, from flexing inwardly; the abutting surfaces of a lug 9 and stop 10 being in a plane substantially the same as the abutting end planes of their links. As the flexible bearing platform travels around the end sprockets and pulleys, or makes any convex turn, the lugs 9 and stops 10 will disengage and open just as the links rock relatively upon their pivots 4 in passing around a curved surface, but will again close upon one another as soon as any portion of the belt becomes alined in one continuous plane. The particular advantages in this form of interlocking links are (1st) to prevent the inward buckling of any portion of the traction platform as it rests upon the ground, thus making a temporarily solid and rigid track of that portion of the belt upon which the load is resting; and (2nd) to take the strain off the pivot pins 4 and reduce the shearing effect otherwise occurring where temporary rigidity against inward bending is sought.

The wheels 6 are arranged in pairs and suitably spaced to accommodate the overlapping lugs 8—9 and central web 11 of the links, and likewise the sprockets and pulleys 5 are divided centrally for the same purpose. The flange sections 7 travel under and support the wheels 6 and load, track-fashion.

As shown in Fig. 3 each link at one end has the lateral bosses 12 which are engaged by the sprockets (see Fig. 1) and the bosses are split as shown at 13 to accommodate the cotters 14 which hold the pivot pins in place so that the cotters are protected and the ends of the pivot pins 4 are flush with the ends of the bosses or hubs 12.

Having thus described my invention, what I claim and desire to secure by Letters Patent is—

1. A pair of links, each substantially T-shaped in cross-section, the horizontal part of each T forming a tread, the web of the two T's pivoted together and abutting endwise, and the webs of the two links having overlapping lugs and stops on the side of the pivot opposite said treads.

2. A link for a platform wheel having a flat tread member, a longitudinal central web, tracks on the back of the tread and on each side of the web, the web perforated at the ends for a pivot bolt and lateral hollow hub bosses at one end surrounding one perforation and through which a pivot pin may pass and said bosses divided so as to accommodate and protect the cotters.

In testimony whereof I have hereunto set my hand in the presence of two subscribing witnesses.

WALTER G. NOACK.

Witnesses:
WILLIAM A. HUSSEY,
MICHAEL J. ROACH.